United States Patent [19]

Schwemmer

[11] 4,183,556
[45] Jan. 15, 1980

[54] LIQUID FILLED FLEXIBLE SEALING JOINT

[75] Inventor: Leonard J. Schwemmer, Erie, Pa.

[73] Assignee: Lord Corporation, Erie, Pa.

[21] Appl. No.: 902,144

[22] Filed: May 2, 1978

Related U.S. Application Data

[63] Continuation-in-part of Ser. No. 792,436, Apr. 29, 1977, abandoned.

[51] Int. Cl.² ............... F16L 27/02; F16L 55/02; F16L 57/00
[52] U.S. Cl. ............... 285/51; 285/223; 285/263
[58] Field of Search ........... 277/3, 27, 59, 100; 285/223, 234, 263, 95, 96, 97, 49, 51, 50, 48, 261, DIG. 1, 227, 228, 229

[56] References Cited

U.S. PATENT DOCUMENTS

| | | | |
|---|---|---|---|
| 1,888,026 | 11/1932 | Chapman | 277/3 X |
| 2,502,322 | 3/1950 | Iredell, Jr. | 285/49 X |
| 3,038,553 | 6/1962 | Peters | 285/228 X |
| 3,194,589 | 7/1965 | Kahlbau et al. | 285/49 |
| 3,504,903 | 4/1970 | Irwin | 285/263 X |
| 3,680,895 | 8/1972 | Herbert et al. | 285/223 X |
| 3,734,546 | 5/1973 | Herbert et al. | 285/234 X |
| 4,068,868 | 1/1976 | Ohrt | 285/223 X |

FOREIGN PATENT DOCUMENTS

| | | | |
|---|---|---|---|
| 2556229 | 6/1977 | Fed. Rep. of Germany | 285/229 |
| 847783 | 9/1960 | United Kingdom | 285/227 |
| 1395789 | 5/1975 | United Kingdom | 285/227 |

Primary Examiner—Mervin Stein
Assistant Examiner—Carl F. Pietruszka
Attorney, Agent, or Firm—Maurice R. Salada; James W. Wright

[57] ABSTRACT

A flexible joint assembly for interconnecting two conduits that transport fluid under pressure includes an annular housing and a tubular member of smaller diameter than the housing. The housing has an opening at each end, as well as two spaced apart, annular flanges that extend radially inwardly with respect to the housing. The tubular member has adjacent one end a flange which extends radially outwardly and which is disposed between the two flanges of the housing. The other end of the tubular member projects from an opening at one end of the housing for attachment to a fluid conduit. Between each housing flange and the flange of the tubular member is an annular flexible element that includes at least one body of elastomer. One side of one of the flexible elements is exposed to the pressurized fluid flowing through the conduits and the joint, while one side of the other flexible element is exposed to the exterior of the joint. Between the other sides of the two flexible elements and within the housing, there is an annular cavity separate from the fluid flow path through the joint. The cavity is fluid tight and is filled with a quantity of substantially incompressible liquid. The liquid in the cavity serves to transmit pressure between the two flexible elements so that the elements act in series to share loads resulting from the difference between the external ambient pressure on the joint and the pressure on the fluid in the joint. The overall construction of the joint thus reduces the pressure on each flexible element and can provide both a primary and a backup sealing mechanism for containing pressurized fluid within the joint.

10 Claims, 1 Drawing Figure

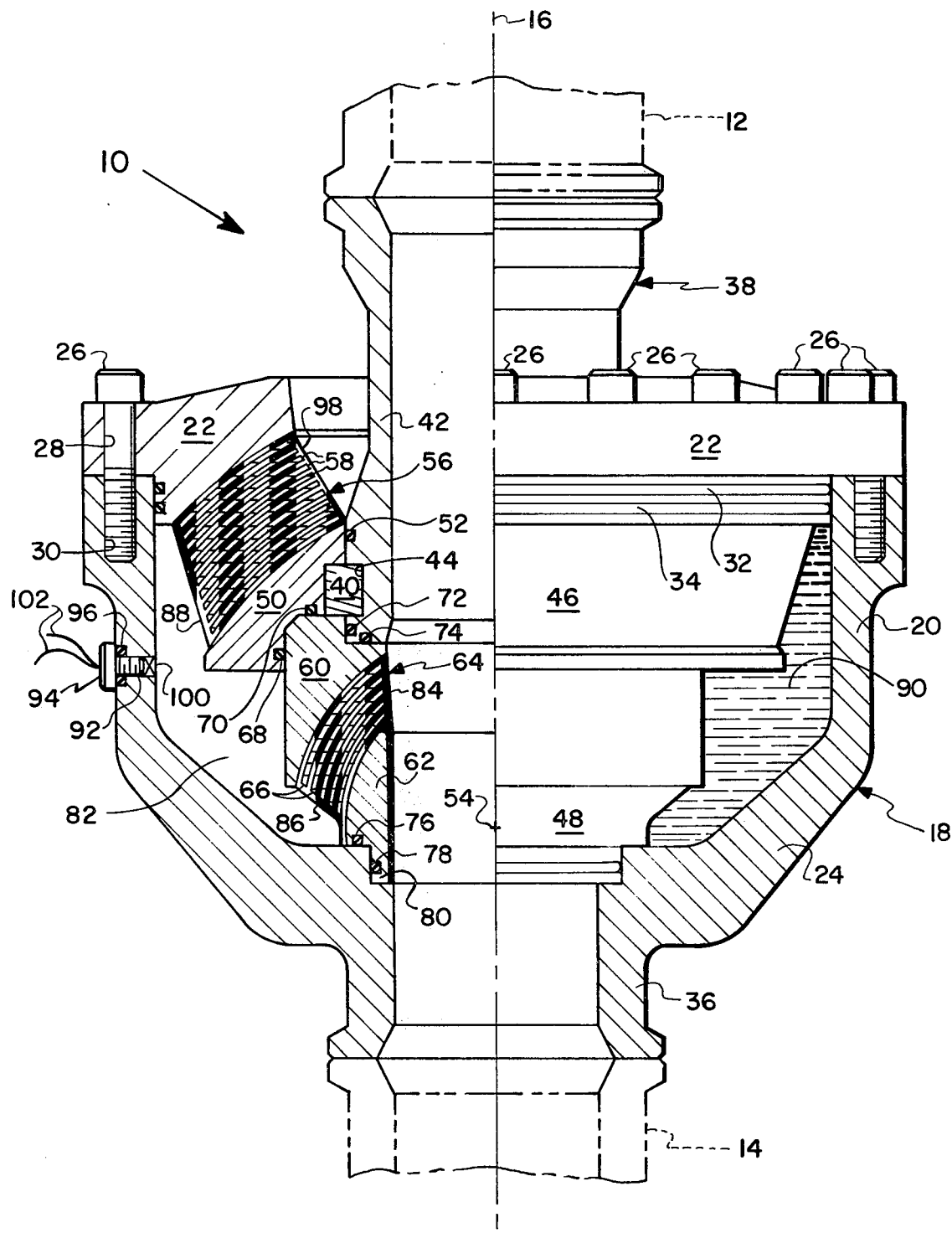

LIQUID FILLED FLEXIBLE SEALING JOINT

This application is a continuation-in-part of application Ser. No. 792,436, filed Apr. 29, 1977, now abandoned.

BACKGROUND OF THE INVENTION

In recent years, the search for new reserves of fuel, particularly new deposits of oil and gas, has been extended to the ocean floor. As exploration efforts reached into the coastal waters of various countries, the drilling techniques developed for use on land were adapted to fit an ocean environment. Thus, the initial efforts at undersea drilling for oil and gas began with the establishment of stable platforms from which to conduct drilling operations. The stability was typically achieved by constructing platforms supported on massive legs that extended down to the ocean floor. Once a well was brought into production, the oil or gas generally was not brought to the water's surface. Instead, the oil or gas from a producing well was conducted along the ocean floor by pipeline to onshore processing facilities.

Offshore exploration for oil and gas continues to move into ever deeper water farther and farther from land. With deeper water, the technique of constructing a stable platform by sinking supports to the ocean floor becomes more costly and less feasible. It also becomes more difficult and expensive to install and maintain pipelines to onshore facilities from oil or gas wells when the wells are drilled at depths of several thousand feet below the water's surface. Consequently, more recent developments in oil and gas exploration have concentrated on the construction of floating drilling platforms and floating preliminary processing facilities. The use of floating facilities has made it particularly necessary to devise suitable and acceptable methods for stabilizing such floating facilities and/or providing both drilling and production riser lines with the flexibility to accommodate the movements of a floating platform.

Although a floating drilling or production platform can be stabilized to some degree, the platform generally remains particularly susceptible to movements in response to wave action. Thus, for example, drilling that is done from a floating platform must accommodate both lateral and vertical motions of the platform. To accommodate such motions, drilling strings, riser lines and similar pipes or conduits which extend downwardly from the drilling platform to the ocean floor must either be provided with articulated joints or must inherently possess a degree of flexibility sufficient to prevent fracture or rupture of the conduits when the drilling platform moves or when waves or water currents act directly on the conduits. Typically, the pipe that is utilized in a drilling string, for example, is of a sufficiently small diameter and has sufficient strength to be flexible enough to avoid damage when an associated drilling platform is subjected to normal vertical or lateral movements. A riser line or marine conductor pipe, on the other hand, has a relatively large diameter and a consequently greater rigidity than a drilling string. Thus, such a large diameter pipe must include one or more couplings or joint assemblies that can be readily flexed and also withstand high internal and external fluid pressures.

One type of flexible joint used in riser pipes consists of a ball member having a precisely machined spherical surface and a socket member having a complementary spherical surface. The joint is flexed by sliding one of the spherical surfaces relative to the other. Resilient O-rings help seal the joint at the interface between the sliding surfaces. The flexural movement of such a ball joint is impaired, however, when the joint is subjected to high pressures. The joint is also subject to frictional wear and deterioration of both the sliding surfaces and the O-ring seals. The frictional wear requires frequent repair or replacement of the joint.

Another type of flexible joint for fluid conduits, such as marine riser pipes, utilizes annular flexible elements disposed between flanges secured to adjacent ends of different sections of conduit. The flexible elements generally comprise alternating layers of a nonextensible material and a resilient material, which are normally metal and an elastomer. The layers or laminations may be annular with flat surfaces, as in the pipe joint of Johnson U.S. Pat. No. 3,168,334, or annular with spherical surfaces, as in the flexible joint of Herbert et al U.S. Pat. No. 3,680,895. Laminated flexible elements permit the necessary flexural movement of a joint and can also function as seals. A joint incorporating a laminated element has no "moving" parts and is not subject to the frictional wear encountered with the ball-and-socket joints discussed above. Other flexible pipe joints utilizing laminated flexible elements are described and illustrated in Herbert et al U.S. Pat. Nos. 3,390,899, 3,734,546, and 3,853,337.

Although joints utilizing laminated flexible elements avoid the wear problem associated with conventional ball-and-socket joints, the laminated elements have a tendency to rupture and fail upon exposure to certain axial loads and to high pressure differentials. The elastomeric layers of laminated elements, while capable of carrying high compressive loads, can only withstand relatively low tension loads. Thus, when adjacent lengths of pipe are subjected to forces that tend to move the lengths axially so as to impose tension loads on the laminated element or elements in a joint connecting the pipe lengths, the laminated flexible elements are likely to fail. One approach to solving the problem of tension loads involves the use of tension bars to carry such tension loads, in preference to the laminated flexible elements. Pairs of laminated flexible elements may also be utilized in a joint such that at least one of the flexible elements is always loaded in compression, regardless of the direction of relative axial movement between adjacent lengths of pipe. The likelihood of rupture of a flexible element due to high pressure differentials exerted on it can be decreased by bonding adjacent laminations of the flexible element into an integral member. It has also been proposed, in copending, commonly owned patent application Ser. No. 821,448, filed Aug. 3, 1977, which is a continuation of abandoned patent application Ser. No. 621,433, filed Oct. 10, 1975, to configure a laminated flexible element so as to provide additional resistance to a high pressure differential acting primarily in one direction.

SUMMARY OF THE INVENTION

The present invention is directed to a flexible joint for interconnecting fluid conduits which provides an improved high pressure, dynamic sealing arrangement. According to the invention, the joint assembly comprises a hollow annular housing and a tubular member of smaller external diameter than the maximum internal diameter of the housing. The housing has an opening at each end and includes a pair of annular flanges that extend radially inwardly with respect to the maximum internal diameter of the housing. The tubular member, which is partially received within the housing, includes, adjacent one end, a flange that extends radially outwardly. The end of the tubular member opposite its flange projects through the opening at one end of the housing for attachment to a fluid conduit. The flange of the tubular member is disposed between the two flanges of the housing, which are spaced apart along the length of the housing. Between each flange of the housing and the flange of the tubular member is an annular flexible element that includes at least one body of elastomer. One of the flexible elements is disposed between the housing and the tubular member so as to define at least part of a fluid-tight passageway that interconnects the tubular member with the opening at the end of the housing opposite the end through which the tubular member projects. Both flexible elements are arranged inside the housing to define with the housing an annular cavity that is separate from the fluid-tight passageway. The flexible element that defines the fluid-tight passageway has one side surface exposed to the fluid in the passageway and an opposite side surface exposed to the annular cavity. The other flexible element also has a side surface exposed to the annular cavity, as well as a side surface exposed to the exterior of the joint assembly. Filling the annular cavity, which is fluid-tight, is a quantity of a substantially incompressible liquid.

The liquid in the annular cavity of the joint assembly serves to transmit pressure between the two flexible elements. Thus, the flexible elements will act in series to share loads resulting from differences between the external ambient pressure on the joint assembly and the pressure on the fluid in the fluid-tight passageway of the assembly. If, for example, the pressure within the joint assembly exceeds the external ambient pressure, the flexible element that defines the fluid-tight passageway through the joint will be deflected in response to the internal pressure. The deflection of the flexible element will impose a load on the incompressible liquid in the annular cavity. The liquid will, in turn, transmit the load to the other flexible element. Because the inner flexible element has offered some resistance to the pressure exerted by the fluid in the joint assembly, the pressure exerted on the outer flexible element will be correspondingly diminished. In addition to sharing the load represented by the pressure differential, the serial arrangement of the flexible elements can provide a backup sealing arrangement in the event the seal afforded by the interior flexible element fails for some reason. In order to have a backup sealing capability, the outer flexible element must be capable of withstanding, by itself, the total pressure differential between the interior and the exterior of the joint.

Although the joint assembly of the present invention bears some general structural resemblance to joints that have been described and illustrated in previously issued patents, the joints shown in the patents do not utilize two flexible elements in series to share the load represented by a pressure difference between the interior and exterior of the joint. Thus, for example, the previously mentioned Herbert et al U.S. Pat. No. 3,680,895, Herbert et al U.S. Pat. No. 3,734,546 and Herbert et al U.S. Pat. No. 3,853,337 describe and illustrate flexible pipe joints or connections which incorporate pairs of flexible elements within an annular housing. The flexible elements in each joint are arranged so as to define an annular cavity which encircles the primary fluid passageway through the joint or connection. Nonetheless, the joints of the three Herbert et al patents do not provide for a sharing of a pressure differential between two flexible elements in any joint. Instead, each joint is constructed to equalize the pressure between the primary fluid flow passageway through the joint and the annular cavity that surrounds the passageway. Only the outer flexible element is effective to seal the joint and to resist pressure differentials. A similar pressure equalizing arrangement may also be utilized in the flexible pipe joint shown in FIG. 4 of Herbert et al U.S. Pat. No. 3,390,899. The U.S. Pat. No. 3,390,899 does not, however, expressly mention the pressure equalization construction that clearly appears in the other three Herbert et al patents. Nonetheless, the U.S. Pat. No. 3,390,899 also does not suggest filling the annular cavity between two flexible elements with a substantially incompressible liquid so that the elements will share the load imposed by a pressure differential.

In one embodiment of the present invention, at least one flexible element of the joint assembly includes both a body of elastomer and a pair of spaced rigid rings. The body of elastomer is disposed between the rings and sealingly engages opposed surfaces of the rings. The arrangement of the body of elastomer and the rings defines between the rings annular exposed surfaces of the elastomeric body corresponding to the exposed side surfaces of the flexible element. One rigid ring of the flexible element sealingly engages the flange of the tubular member, while the other rigid ring of the flexible sealing engages a flange of the housing. In the preferred embodiment of the invention, each flexible element also includes a plurality of spaced apart, annular shims formed of a substantially inextensible material and embedded in the body of elastomer. The shims and the body of elastomer and generally spherically shaped annuli. The shims improve the compression load carrying capabilities of the elastomer and, when spherically shaped, also facilitate pivoting movements of the tubular member with respect to the housing about axes transverse to the longitudinal axis of the joint assembly. To help insure that tension loads are not applied to the elastomeric bodies of the flexible elements, one of the flexible elements may be constructed to be less resistant to or more easily compressed by compression loads than is the other flexible element. When the loads on the joint assembly in use will be imposed primarily in one axial direction, the less flexible or more compression resistant flexible element is arranged so as to be loaded in compression by loads in the primary direction. The softer flexible element is arranged so as to be deflected or compressed when the housing is assembled. As axial loads are applied on the joint assembly in use, the initial or precompression load on the softer flexible element is partially relieved, but the element is never placed in tension.

BRIEF DESCRIPTION OF THE DRAWING

For a better understanding of the present invention, reference may be made to the following description of an exemplary embodiment, taken in conjunction with the single FIGURE of the accompanying drawing, which is a longitudinal view, partly in section, of a flexible joint assembly constructed according to the invention.

DESCRIPTION OF EMBODIMENT

The drawing illustrates, partly in section, a flexible pipe joint assembly 10 connected at each end to a length of conduit 12 or 14 (shown in phantom). The connections to the lengths of conduit 12 and 14 provide fluid-tight seals and may be achieved by any one of a number of conventional methods, such as: bolts passing through adjacent flanges formed on the joint assembly 10 and on the conduit lengths; external clamping mechanisms that engage the adjacent flanges of the joint assembly and the conduit lengths; and welding of the conduit lengths to the joint. The conduit lengths 12 and 14 are suitably constructed to conduct a fluid, such as oil, natural gas, or water, without leakage. In use, the conduit lengths 12 and 14 and the joint assembly 10 are also immersed in a fluid, typically water, by perhaps just air, which exerts pressure on the exteriors of the conduit lengths and the joint assembly. The ambient external pressure thus exerted on the conduits 12 and 14 and the joint assembly 10 is generally different from the pressure exerted by the fluid being transported by the conduits. As will be explained, the joint assembly 10 is constructed to provide between the conduit lengths 12 and 14 a fluid-tight connection that is capable of withstanding the difference between the external ambient pressure and the pressure of the fluid in the conduits. The joint assembly 10 also permits pivoting movements of the conduits 12 and 14 relative to each other about axes transverse to the longitudinal axis 16 of the joint assembly.

The joint assembly 10 includes a hollow annular housing 18. The housing 18 includes a generally tubular or annular body portion 20 and two flange members 22 and 24 which extend generally radially inwardly from the tubular body portion. Both flanges 22 and 24 and the body portion 20 are fabricated of an impermeable material, such as steel. The flange 22 is annular in shape and is located at one end of the body portion 20 of the housing 18. The inner circumference of the flange 22 provides an opening at the end of the housing 18 for a purpose that will be explained. The flange 22 is secured about its radially outer periphery to the body portion 20 of the housing 18 by a plurality of bolts 26. The shank of each bolt 26 passes through one of a plurality of circumferentially spaced apart bores 28 formed about the periphery of the flange 22. The shank also extends into one of a plurality of bores 30 formed axially into the body portion 20 of the housing 18 and aligned with the bores 28 in the flange 22. The bores 30 are threaded so that the threaded portions of the shanks of bolts 26 may be screwed into the bores 30. The head of each bolt 26 has a specially configured recess (not shown) that can be engaged by a tool such as an allen wrench to tighten the bolt 26 in a threaded bore 30. To ensure that a fluid-tight seal is provided between the flange 22 and the body portion 20 of the housing 18, two annular O-rings 32 and 34 encircle an axially extending portion of the flange 22. The O-ring 32 and 34 are received in parallel, annular grooves formed in the axially extending portion of the flange 22 and both sealingly engage an adjacent surface of the body portion 20 of the housing 18.

The other flange 24 of the housing 18 is formed in one piece with the tubular body portion 20 of the housing. Because the flange 24 is subjected to greater loads directed normal to its major surfaces than is the body portion 20 of the housing 18, the flange is noticeably thicker than the body portion. The flange 24 is annular and is spaced from the flange 22 along the longitudinal axis 16 of the joint assembly 10 and the housing 18. Adjacent the interior circumference of the annular flange 24, a short tubular portion 36 of the housing 18 extends axially of the flange 24 and away from both flanges 22 and 24 to provide an attachment for the adjacent length of conduit 14. Together, the inner circumference of the annular flange 24 and the tubular extension 36 define an opening at the end of the housing 18 opposite the flange 22.

A short tubular member 38, which is formed of an impermeable material, such as steel, projects through the opening in the housing 18 defined by the inner circumference of the flange 22. The end of the tubular member 38 that is exposed from the housing 18 sealingly engages the adjacent length of conduit 12. The end of the tubular member 38 that is received within the housing 18 includes an annular flange 40 that extends radially outwardly from the main body portion 42 of the tubular member. The flange 40 is thus located between the flanges 22 and 24 of the housing 18. The flange 40 is an element fabricated separately from the body portion 42 of the tubular member 38 and is essentially a ring received in an annular groove 44. The groove 44 is formed about the exterior circumference of the tubular member 38 adjacent one end of the body portion 42. In the illustrated embodiment of the invention, the annular flange 40 does not sealingly engage the body portion 42 of the tubular member 38 because appropriate seals are provided elsewhere in the joint assembly.

Located between the flange 22 of the housing 18 and the flange 40 of the tubular member 38 and between the flange 24 of the housing and the flange 40 of the tubular member are annular flexible elements 46 and 48, respectively. Each of the flexible elements 46 and 48 includes an annular body of elastomer and the elastomer is disposed between two relatively massive, annular rigid end members or end plates. For the flexible element 46, one end member is provided by the annular flange 22 of the housing 18. Opposite and spaced from the flange 22 is an end plate 50, which is part of the flexible element 46. The end plate 50, which is preferably metal, engages and is supported on the annular flange 40 of the tubular member 38. An annular O-ring 52 provides a seal between the end plate 50 and the tubular member 38. The mutually opposed surfaces of the flange 22 and the end member 50 have spherical contours. In the illustrated embodiment of the invention, the spherical contours are defined by circular arcs that have a common origin, designated 54. It would also be possible, however, for the spherical contours to be defined by identical circular arcs with origins displaced from each other along the axis 16. Disposed between and bonded to the opposed, spherically shaped surfaces of the flange 22 and the end member 50 is a body of elastomer 56. The elastomeric body 56 incorporates a series of annular, spaced apart shims 58 formed of a material that is substantially inextensible as compared to the elastomer. Viewed another way, the structure interposed between the flange 22 and the end plate 50 is formed of a plurality of alternating and bonded together layers of an elastomeric material and a nonextensible material.

The nonextensible shims or laminations 58 of the flexible element 46 are preferably formed of steel, while the body of elastomer or the elastomeric laminations are preferably a nitrile rubber. The nitrile rubber has a high resistance to attack by petroleum products. Other inextensible and elastomeric materials may be substituted for the steel and nitrile rubber where appropriate. Alternate elastomeric materials include natural rubber and other synthetic rubbers, while alternate inextensible materials include other metals, fiberglass, reinforced plastics, and fiber reinforced resin materials. Each of the laminations in the flexible element 46 has a spherical contour or, when viewed in radial section, surfaces defined by circular arcs. The circular or spherical contours are generated by circular arcs having the same origin as the arcs that generated the opposed surfaces of the flange 22 and the end plate 50. The multiple spherical contours that are incorporated into the flexible element 46 permit the element to function as a universal joint. Relative rotational motion between adjacent non-elastomeric components (i.e., the inextensible laminations 58, the end plate 50, and the flange 22) is accommodated by flexing or shearing of the elastomer 56.

The flexible element 48 is constructed in much the same manner as the flexible element 46. The element 48 includes two relatively massive, annular rigid end members 60 and 62, both of which are preferably formed of metal. The spaced apart end plates 60 and 62 have opposed spherically shaped surfaces generated by circular arcs having a common origin. The common origin of the arcs that generate the curved surfaces of end members 60 and 62 is coincident with the origin 54 of the circular arcs that generate the spherical surfaces of the flange 22, the end plate 50, and the shims 58 of the flexible element 46. An annular body of elastomer 64 is interposed between and bonded to the opposed spherical surfaces of the end plates 60 and 62. Like the body of elastomer 56 of the flexible element 46, the body of elastomer 64 has embedded in it a plurality of spaced apart shims 66 formed of a material that is substantially inextensible as compared to the elastomer. The shims 66 are annular in shape and have circular surfaces, when viewed in radial section. The circular or spherical surfaces are generated by circular arcs having origins coincident with the origins of the arcs that generate the curved surfaces of the end plates 60 and 62. The elastomer 64 and the shims 66 may be formed of the same materials as the elastomer 56 and the shims 58 of the flexible element 46. Nonetheless, the flexible element 48 is constructed to be softer or more flexible in response to compression loads than is the flexible element 46. The difference in flexibility or stiffness may be achieved, for example, by utilizing a softer or more resilient elastomer or by arranging the shims 66 in the flexible element 48 to give a lower shape factor than in the flexible element 46.

The surfaces of the end plate 60 that are generally opposite the curved surface bonded to the elastomer 64 engage mating surfaces of the end plate 50, the annular flange 40 of the tubular member 38, and the main body portion 42 of the tubular member. The end members 50 and 60 and the tubular member 38 fit together such that relative radial movement between the end members and the tubular member is minimized, if not prevented. Two annular O-rings 68 and 70 are received in grooves formed in the end member 50 so as to seal the interface between the end plate 50 and the end plate 60. Similarly, two annular O-rings 72 and 74 are carried in annular grooves formed in the body portion 42 of the tubular member 38 to seal the interface between the tubular member 38 and the end plate 60. The result of the seals formed between the end plates 50 and 60 and between each of the end plates 50 and 60 and the body portion 42 of the tubular member 38 is that the flange 40, while not sealingly engaged with any other member, is effectively sealed against fluid contact.

The end plate 62 of the flexible element 48 mates with and is supported by the flange 24 of the housing 18. Two annular O-rings 76 and 78, which are received in annular grooves formed in the end member 62, seal the mating surfaces of the flange 24 and the end plate 62. A flange portion 80 of the end member 62 extends lengthwise of the housing 18 and fits into a correspondingly configured annular recess formed adjacent the inner circumference of the flange 24. The engagement between the flange 80 and the recess in the flange 24 is such that the end member 62 is effectively prevented from moving radially with respect to the housing 18, as well as along the axis 16 in the direction of the conduit 14. A thin skin of elastomer covers the radially innermost surface of the end member 62 to provide a corrosion resistant wearing surface.

When the various components of the joint assembly 10 are assembled as shown in the drawing, a fluid-tight passageway is formed within the housing 18 between the tubular member 38 and the opening in the housing afforded by the flange 24 and the tubular extension 36. The passageway is defined by an annular side surface 84 of the flexible element 48. Also within the housing 18, there is formed an annular fluid-tight cavity 82 that surrounds, but is separate from the fluid-tight passageway. The cavity 82 is defined by the inner surface of the body portion 20 of the housing 18, the inner surface of the housing flange 24, the side surface 86 of the flexible element 48 opposite the surface 84, and one side surface 88 of the flexible element 46. The cavity 82 is filled with a substantially incompressible liquid 90, such as water, mineral oil, or a mixture of water and ethylene glycol. The incompressible liquid may be introduced into the cavity 82 through a bore 92 formed in the body portion 20 of the housing 18. The bore 92 is sealed by a threaded closure 94 and an O-ring 96.

In the assembled joint, the exposed end of the tubular member 38 may be connected and sealed to the adjacent end of the length of conduit 12. The free end of the tubular extension 36 from the flange 24 of the housing 18 may similarly be secured and sealed to the adjacent end of the length of conduit 14. Fluid under pressure, such as oil or gas, can flow from the conduit 12 to the conduit 14, or vice versa. In an oil or gas well or well drilling installation, the conduit lengths 12 and 14 will normally be maintained in tension throughout their lengths. The tension load, which is transmitted to the joint assembly 10, is carried by compression loading of the flexible element 46. Since a compression load on the flexible element 46 will result in deflection of the elastomer 56 in the element, the end plate 50 of the element 46 and the flange 40 of the tubular member 38 will both tend to move away from the end plate 60 of the flexible element 48. To prevent such relative movement from interrupting the seals at the interfaces between the end plate 50 and the end plate 60 and between the end plate 60 and the tubular member 38, the flexible elements 46 and 48, on assembly of the joint 10, are predeflected, and thus preloaded, between the housing flanges 22 and 24. The assembly predeflection or preload deflects the flexible element 48 in preference to the flexible element 46 due to the difference in the compression stiffnesses of the two elements. Thus, when a tension load is applied on the conduits 12 and 14 connected by the joint assembly 10 and is transmitted to the flexible element 46 as a compression load, the resulting deflection of the flexible element 46 is not sufficient to relieve completely the compression load on the flexible element 48. The O-ring seals 70, 74 and 76, for example, will remain loaded in compression to help seal the interfaces between the end members 50 and 60 and between the end plate 60 and the tubular member 38. The assembly preload also provides a limited frictional engagement between adjacent metal surfaces to prevent relative rotation between adjacent metal members.

The spherical surfaces of the nonelastomeric components of the flexible elements 46 and 48 facilitate angular misalignments between the lengths of conduit 12 and 14 on either side of the joint assembly 10. Angled relative orientations of the conduit lengths 12 and 14 are accommodated by relative rotational movements between the nonelastomeric components of each flexible element 46 or 48 and by shearing of the elastomer 56 and 64 in the flexible elements. The relative rotation of the nonelastomeric components occurs about the common center 54. While being deflected, the flexible elements 46 and 48 maintain fluid-tight seals against the fluid that flows through the joint assembly 10. Since there will almost invariably be a difference between the pressure exerted by the fluid flowing through the conduits 12 and 14 and the joint assembly 10 and the pressure exerted by the fluid in which the conduits and joint assembly are immersed, the flexible elements 46 and 48 will tend to deflect in response to the pressure differential. Assuming that the fluid within the conduits 12 and 14 and the joint assembly 10 is at a higher pressure than the external ambient pressure, the result will be that the pressure exerted on the interior side surface 84 of the flexible element 48 will cause the elastomer 64 of the flexible element to deflect or bulge towards the opposite side surface 86 of the element. The radially outward bulging or deflection of the elastomeric portion of the side surface 86 will, in turn, impose a load on the liquid 90 within the annular cavity 82. Since the liquid 90 in the cavity 82 is substantially incompressible, the load exerted by the elastomeric portion of the radially outer side surface 86 of the flexible element 48 will be transmitted practically without reduction to the side surface 88 of the flexible element 46 which is presented to the interior of the cavity. The load on the side surface 88 will be resisted by the flexible element 46 and may or may not result in deflection of the elastomeric portion of the opposite side surface 98 of the flexible element 46.

Due to their bonded engagement with their associated end members, the elastomeric bodies 56 and 64 of the flexible elements 46 and 48, respectively, offer resistance to pressures exerted on them. Consequently, the bodies 56 and 64 do not transmit a pressure or load from one side surface of a flexible element to the other side surface without some diminution. The incorporation of the nonextensible shims 58 and 66 into the bodies of elastomer 56 and 64, respectively, greatly reduces the tendency of the elastomer to bulge or deflect in response to pressures or loads. As a result, a load or pressure exerted on one side surface of a flexible element is strongly resisted by the laminated elastomeric body in the element and the pressure observed at and imposed by the other side surface of the flexible element is significantly less than the initial pressure. Thus, in the example set out in the preceding paragraph, the pressure exerted on the liquid 90 in the cavity 82 by the flexible element 48 will be less than the pressure exerted on the flexible element 48 by the fluid in the joint assembly 10. Only the reduced pressure exerted on and by the incompressible liquid 90, which will be a pressure intermediate the external ambient pressure and the pressure exerted by the fluid in the joint assembly 10, must be resisted by the flexible element 46. The difference between the pressure of the fluid within the joint assembly 10 and the external ambient pressure on the joint assembly is, therefore, resisted in part by each of the two flexible elements 46 and 48. The amount of pressure imposed on each of the flexible elements 46 and 48 will be affected by factors such as the relative surface areas of the elements exposed to the pressures of the various fluids, and the relative stiffnesses or resiliences of the elastomers used in the flexible elements. The proportion of the total pressure differential which is resisted by each flexible element 46 or 48 can be adjusted by initially pressurizing the liquid 90 in the cavity 82 to some pressure greater than standard atmospheric pressure. Such prepressurization should not, however, exceed the larger of the pressure expected to be exerted by the fluid in the joint assembly 10 and the expected external ambient pressure, when the joint assembly is in use. If the prepressurization of the liquid 90 did exceed both of the pressures expected to be applied to the joint assembly, internally and externally, in use, at least one of the two flexible elements 46 and 48 would be subjected to a pressure differential greater than if it were exposed directly to both the external ambient pressure and the pressure of the fluid in the joint assembly 10. Such a result would negate the benefits of the intended sharing of pressure differences by the flexible elements 46 and 48.

Since the two flexible elements 46 and 48 act in series to resist the pressure differential that exists between the interior and the exterior of the joint assembly 10, the elements can also provide a dual or redundant sealing arrangement against leakage. If the interior flexible element 48, which acts as a primary seal, were to fail, the flexible element 46 could act as a backup or fail-safe seal against escape of the fluid in the joint assembly 10. Such a feature is particularly important where the fluid in the joint assembly 10 is oil or some other potential pollutant or contaminant. To facilitate utilizing the flexible element 46 as a backup seal, the exterior flexible element 46 is designed to withstand the total pressure difference between the interior and the exterior of the joint assembly 10.

To improve the usefulness of the joint assembly 10 as a fail-safe or redundant sealing mechanism, a pressure transducer 100 is placed within the housing 18 to sense the pressure of the liquid 90 in the annular cavity 82. A convenient location for the transducer 100 is at the end of the bore 92 used to fill the cavity 82 with liquid 90. Electrical conductors 102 extend through a small bore (not shown) formed in the threaded closure 94 to a remote display or recording device to facilitate monitoring the pressure in the cavity 82. The pressure readings transmitted by the transducer 100 permit the identification of a failure of one or both of the flexible elements 46 and 48 by virtue of a change in pressure within the annular cavity 82. Immediate corrective action can then be taken to minimize the effects of an oil spill, for example, if both flexible elements 46 and 48 fail. Less urgent action can be taken to replace the joint assembly 10 if only one of the flexible elements 46 or 48 fails.

A number of structural variations in the illustrated embodiment of the invention are possible without affecting the functioning of the joint assembly 10. Thus, for example, the primary seal or innermost flexible element 48 may include a body of elastomer 64 without any nonextensible laminations or shims 66. Such a construction may be possible because the flexible element 48 is not normally subjected to substantial compressive loads, unlike the flexible element 46. It would also be possible, although somewhat inconvenient, to manufacture all or some of the following individual components as an interconnected, one-piece unit: the body portion of the tubular member 38; the flange 40; the end plate 50; and the end plate 60. The flange 22 of the housing 18 might be attached to the body portion 20 of the housing by mechanisms other than bolts, such as mating threads on the flange and the body portion. The flange 24 might be an item separate from the body portion 20 of the housing 18. The flange 40 could be formed in one-piece with the body portion 42 of the tubular member 38 and could entirely separate end members 50 and 60. It would also be possible to eliminate the tubular extension 36 and to attach the conduit 14 directly to the flange 24. The flexible element 46 might include two distinct end members, rather than utilizing the flange 22 of the housing 18 as an end member. Also, as previously indicated, the curved surfaces of the components of the flexible elements 46 and 48, such as shims 58 and 66, need not all be concentrically disposed about a common origin such as point 54. The shims might also be tapered, rather than having a constant thickness, measured radially of point 54. Other possibilities for the construction of flexible elements 46 and 48 are described and illustrated in copending, commonly owned application Ser. No. 821,448, filed Aug. 3, 1977, which is a continuation of abandoned patent application Ser. No. 621,433, filed Oct. 10, 1975.

As is suggested by the foregoing paragraph, the embodiment described above is merely exemplary and persons skilled in the art may make many variations and modifications without departing from the spirit and scope of the invention. All such modifications and variations are intended to be within the scope of the invention as defined in the appended claims.

What is claimed is:

1. In a joint assembly for interconnecting two conduits that receive fluid under a pressure different from an external ambient pressure on the conduits, said assembly comprising a hollow annular housing having an opening at each end and including first and second annular flanges that extend radially inwardly relative to a maximum internal diameter of the housing, the two flanges being spaced apart along a longitudinal axis of the housing so that the first flange is closer to one end of the housing than to the other, a tubular member of smaller external diameter than said maximum internal diameter of the housing, the tubular member including adjacent one end a flange which extends radially outwardly of said member and which is disposed between the two flanges of the housing, the other end of the tubular member projecting from the opening at the one end of the housing for attachment to a fluid conduit, and means defining two annular flexible elements, each of which includes at least one body of elastomer and has a pair of annular exposed side surfaces, a first flexible element encircling the tubular member and being disposed between the first flange of the housing and the flange of the tubular member, the second flexible element being disposed between the second flange of the housing and the flange of the tubular member so as to define at least part of a fluid-tight passageway that interconnects the tubular member with the opening at the other end of the housing to permit a flow of fluid between the tubular member and said end opening of the housing, at least one of the two flexible elements also being disposed so as to resist through compression loading of its body of elastomer relative movements between the housing and the tubular member in at least one direction that is generally parallel to the longitudinal axis of the housing, relative pivotal movement between the housing and the tubular member about an axis transverse to the longitudinal axis of the housing being accommodated by deflection in shear of the body of elastomer of at least one flexible element, at least the housing and the flexible elements being arranged to define within the housing an annular cavity that is separate from the fluid-tight passageway, one side surface of the first flexible element being presented to said external ambient pressure and the other side surface of the first flexible element being presented to said annular cavity, one side surface of the second flexible element being presented to the fluid-tight passageway and the other side surface of the second flexible element being presented to said annular cavity, the improvement wherein said annular cavity is fluid-tight and wherein a quantity of substantially incompressible liquid fills said cavity, the liquid in said cavity serving to transmit pressure between said other sides of the flexible elements so that the flexible elements act in series to share loads resulting from the difference between the external ambient pressure and the pressure on the fluid in the conduits and fluid-tight passageway.

2. A joint assembly, according to claim 1, where at least one of the flexible elements also includes a pair of spaced rigid rings, the body of elastomer of said flexible element being disposed between the rings and sealingly engaging opposed surfaces of the rings so as to define between the rings annular exposed surfaces of the elastomeric body corresponding to the exposed side surfaces of the flexible element.

3. A joint assembly, according to claim 2, wherein one rigid ring of said at least one flexible element sealingly engages the tubular member and wherein the other rigid ring of said at least one flexible element sealingly engages one of said first and second flanges of the housing.

4. A joint assembly, according to claim 2, wherein the body of elastomer in said at least one flexible element is bonded to each of the rigid rings of said element.

5. A joint assembly, according to claim 1, wherein each flexible element also includes a plurality of spaced annular shims of substantially inextensible material embedded in and bonded to the body of elastomer of said element.

6. A joint assembly, according to claim 5, wherein each shim and each body of elastomer is a generally spherically shaped annulus.

7. A joint assembly, according to claim 1, wherein the liquid in the cavity is prepressurized to have a pressure greater than standard atmospheric pressure when both the external ambient pressure and the pressure in the fluid-tight passageway are equal to standard atmospheric pressure.

8. A joint assembly, according to claim 1, wherein the second flexible element is less resistant to and more easily compressed by compressive loads imposed by the flange of the tubular member and the second flange of the housing than is the first flexible element with respect to compressive loads of equal magnitude imposed by the flange of the tubular member and the first flange of the housing.

9. A joint assembly, according to claim 1, wherein a sealable port is formed in the housing extending from an exterior surface of the housing to the annular cavity defined within the cavity.

10. A joint assembly, according to claim 1, wherein the second flange of the housing is formed in one piece with an annular main body portion of the housing.

* * * * *